United States Patent
Laarhuis et al.

(10) Patent No.: US 7,159,029 B2
(45) Date of Patent: Jan. 2, 2007

(54) SYSTEM FOR PERSONALIZED INFORMATION DISTRIBUTION

(75) Inventors: Jan Herman Laarhuis, Enschede (NL); Herman Pals, The Hague (NL); Jerry Van De Leur, Gouda (NL)

(73) Assignee: Koninklijke KPN. N.V., The Hague (NL)

( * ) Notice: Subject to any disclaimer, the term of this patent is extended or adjusted under 35 U.S.C. 154(b) by 632 days.

(21) Appl. No.: 10/105,955

(22) Filed: Mar. 25, 2002

(65) Prior Publication Data

US 2002/0136227 A1 Sep. 26, 2002

(30) Foreign Application Priority Data

Mar. 26, 2001 (EP) .................................. 01201126

(51) Int. Cl.
*G06F 15/16* (2006.01)

(52) U.S. Cl. .................... 709/233; 709/219; 709/252
(58) Field of Classification Search ................ 709/226, 709/238–244, 201–203, 217–219, 230–237, 709/252; 370/408
See application file for complete search history.

(56) References Cited

U.S. PATENT DOCUMENTS

| | | | | |
|---|---|---|---|---|
| 5,838,970 A | * | 11/1998 | Thomas ....................... | 719/316 |
| 5,892,909 A | | 4/1999 | Grasso et al. | |
| 5,893,091 A | | 4/1999 | Hunt et al. | |
| 5,946,316 A | * | 8/1999 | Chen et al. .................. | 370/408 |
| 5,983,005 A | | 11/1999 | Monteiro et al. | |
| 6,108,703 A | * | 8/2000 | Leighton et al. ............. | 709/226 |
| 6,167,438 A | * | 12/2000 | Yates et al. .................. | 709/216 |
| 6,553,420 B1 | * | 4/2003 | Karger et al. ................ | 709/226 |
| 7,035,933 B1 | * | 4/2006 | O'Neal et al. ............... | 709/233 |
| 2002/0010798 A1 | * | 1/2002 | Ben-Shaul et al. .......... | 709/247 |
| 2002/0026645 A1 | * | 2/2002 | Son et al. ..................... | 725/117 |
| 2002/0040389 A1 | * | 4/2002 | Gerba et al. ................. | 709/219 |
| 2002/0087659 A1 | * | 7/2002 | Chapman et al. ............ | 709/218 |
| 2002/0091810 A1 | * | 7/2002 | Hundscheidt et al. ........ | 709/223 |
| 2002/0184368 A1 | * | 12/2002 | Wang .......................... | 709/226 |
| 2003/0051051 A1 | * | 3/2003 | O'Neal et al. ............... | 709/242 |
| 2003/0115340 A1 | * | 6/2003 | Sagula et al. ................ | 709/228 |
| 2004/0071083 A1 | * | 4/2004 | Li et al. ....................... | 370/230 |

OTHER PUBLICATIONS

Secure Hypertext Transfer Protocol, <http://searchsecurity.techtarget.com/sDefinition/0,,sid14_gci214006,00.html>, Dec. 2000.*

* cited by examiner

*Primary Examiner*—Krisna Lim
*Assistant Examiner*—Philip S. Scuderi
(74) *Attorney, Agent, or Firm*—Michaelson & Associates; Peter L. Michaelson

(57) ABSTRACT

System for personalized information distribution (PID) from an information source server (1) to several user terminals (2) via an information distribution network (3) comprising several active nodes (4), forming a PID-tree (5). The active nodes comprise distribution control means (6) setting the information distribution process in the relevant active node in accordance with local distribution parameters (parm). The distribution parameters are manageable via said network by distribution control codes (dcc) originated by said user terminals or by other active nodes in the PID-tree. For setting-up or modifying the respective PID-path for the distribution of information from the information source server to the respective user terminal, the user terminal transmits its distribution control code to the first and—as far as necessary—further active nodes of the PID-path between the user terminal and the information source server and sets the active node's distribution control means according the user's capabilities and preferences.

9 Claims, 3 Drawing Sheets

SYSTEM FOR PERSONALIZED INFORMATION DISTRIBUTION

BACKGROUND OF THE INVENTION

1. Field of the Invention

The invention relates to a system for personalized information distribution (PID) from an information source server to several user terminals via an information distribution network.

The proposed PID service aims to provide tailor-made information distribution to receivers using different devices, access technologies and access speeds. Examples of PID services are live television in a user's own format/speed and language, real-time stock exchange information of your favorite stocks on various devices, or distribution of a video stream to many end-users with different access technologies, access speeds, and various requirements regarding QoS.

2. Description of the Prior Art

In current IP networks, it is difficult to distribute information, e.g., a video stream, to many end-users with different access technologies and access speeds. Some possible solutions are:

- sending multiple videostreams with different quality classes (e.g., 33 kbps on PSTN, 64 kbps on TSDN, 500 kbps on ADSL, etc.);
- sending the videostream with the lowest quality and decreasing the service for the end-users connected with higher speeds;
- selective discard of information elements, e.g., low priority videoframes in hierarchically encoded schemes. These solutions can be implemented using traditional point-to-point IP, or using IP-multicasting. The former is resource-intensive, but mechanisms for quality differentiation exist; the latter is resource efficient, but the creation and management of large multicast is complex. Moreover, until now IP-multicast only supports best-effort.

SUMMARY OF THE INVENTION

According to the present invention an active solution for PID is proposed, applicable to video and or other content distribution. In this solution, content is generated by a (single) source in a single format/quality, and distributed through the network to the end-users using a PID-tree consisting of paths (branches) with "active nodes" (also called "active network nodes " or "active (network) servers") . The end-users may have different access capabilities like PSTN, ISDN, ADSL and LAN, and may have different terminal capabilities, for instance color or black/white display etc. or other Quality-of-Service parameters. The appropriate (not necessarily all) active nodes run "PID Active Components" (PACs) which function as distribution control (or processing) means which, inherently to the active node or active network technology, can be set and manipulated from outside the respective active node, via the network. The PACs can be set by user terminals and by each of the active nodes. In particular for the distribution of information via said PID-trees, the PACs may be composed of a specific configuration of replication ('R') and transcoding ('T'), while additional Basic Building Blocks (EBB) may be added. Setup of the delivery tree, i.e., the PID-tree, is executed fully distributed and is governed by an advertise-subscribe model: content will be advertised using existing end-user mechanisms, e.g., via a webpage (of the relevant PID service provider), and end-users can subscribe to specific content. The "algorithm" for the setup or modification of the PID-tree will be discussed below.

Summarizing, the invention refers to a system for personalized information distribution (PID) from an information source server to several user terminals via an information distribution network, where, according to the invention, the network comprises several active nodes, the information being distributed to the terminals via a PID-tree comprising respective PID-paths between respective user terminals and the information source server, each PID-path comprising one or more of the active nodes, while the active nodes comprise distribution control means for setting the information distribution process in the relevant active node in accordance with local distribution parameters, the distribution parameters being manageable via the network by means of distribution control codes originated by the user terminals or by other active nodes. For setting-up or modifying the respective PID-path for the distribution of information from the information source server to the respective user terminal, according to a further elaboration of the invention, the user terminal transmits a subscription message, containing a distribution control code to the first active node of the PID-path between the user terminal and the information source server, the distribution control code representing the user terminal's capability parameters and/or the user's preferences parameters like QoS, bandwidth, screen mode etc. The control code, after being received by the first active node, is compared in the distribution control means with the local distribution parameters already set (if not explicitly set, the parameters may have default values) in the distribution control means, while the parameters are amended by the control codes in conformity with the user terminal's capability parameters and/or the user's preferences parameters if the local distribution parameters set in the active node do not match those user terminal's capability parameters and/or the user's preferences parameters. When they do match, it may be unnecessary to amend the distribution parameters in any of next upstream active nodes. When the set local parameters are amended, the next upstream active node has to be investigated to determine whether its local parameters do or do not match the user terminal's or user's parameters. According to the invention, in that case, insofar applicable with respect to the number of intermediate active nodes in the relevant PID-path, in one or more sequential steps, a further distribution control code (which may be equal to the control code already mentioned), representing the last active node's new local distribution parameters is always forwarded to the next intermediate active node in the relevant PID-path between the user terminal and the information source server, in which next intermediate active node its distribution parameters, set in its distribution control means, are compared, by those distribution control means, with the parameters as represented by the control code received from the preceding active node and are, if applicable, brought into conformity with the parameters represented by that control code. So, according to the above "algorithm", the distribution parameters in each PID-branch used for downstream distribution of information from the information source to the users is set in an upstream process, initiated by the user terminal, which sends its desired distribution (transmission) parameters to the first, most downstream, active node in the distribution chain (PID-path), setting the node's distribution parameters (QoS, bandwidth etc.) as desired by the terminal, after which the most downstream node, aware of the PID-path, successively investigates its predecessor in the PID-path whether they are fit for downstream distribution the source server's information in accordance with the user (terminal)'s desires, represented by the upstream forwarded distribution control code.

BRIEF DESCRIPTION OF THE DRAWINGS

FIG. 1a schematically shows the function of the distribution control means situated within each active node;

DETAILED DESCRIPTION

Figure 1:
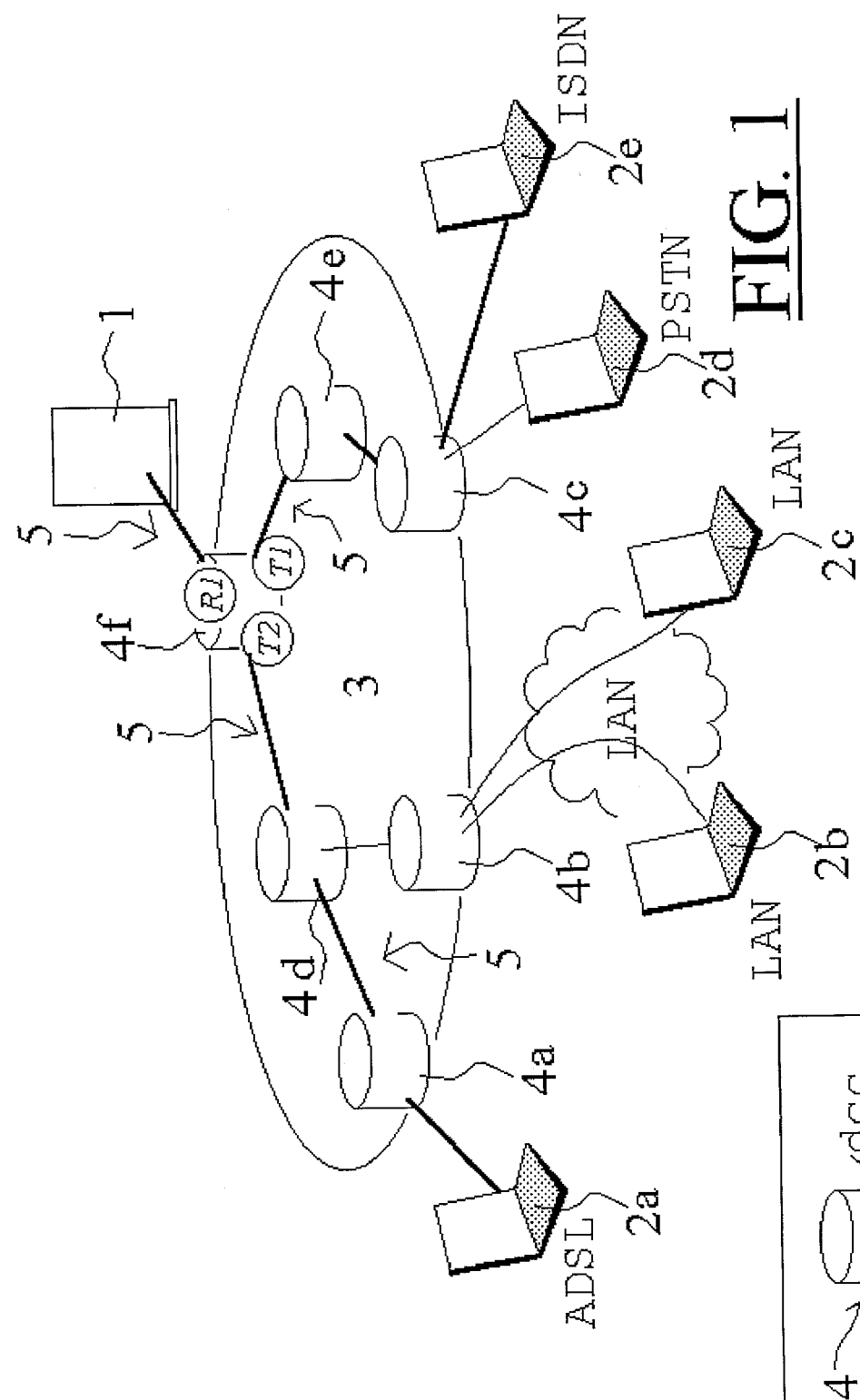
FIG. 1 is a block diagram illustrating the present invention shown in the context of an information source server 1, distributing information to several user terminals 2 via an information distribution network 3.

FIG. 1, illustrating the present invention, shows an information source server 1, distributing information to several user terminals 2 via an information distribution network 3. The network 3 comprises several active nodes 4, the information being distributed to the terminals 2 via a PID-tree 5 comprising respective PID-paths between the respective user terminals 2 and the information source server 1. Each PID-path comprises one or more of the active nodes 4; the active nodes comprise distribution control means 6 ("PAC" in FIG. 1a), the distribution parameters of which can be controlled via the network 3 by the user terminals 2 and mutually by the several active nodes. FIG. 1 shows a PID-tree consisting of two active PID-paths, 1-4f-4d-4a-2a and 1-4f-4e-4c-2e respectively as the result of a (previous) subscription of an ADSL-user 2a and an ISDN-user 2e to the server's 1 information distribution service. This has led to the establishment of a replication building block (RBB) R1 and transcoding building blocks (TBBs) T1 and T2 at active node 4f (T1 transcodes—resulting in bandwidth reduction—the downstream information stream to be fit for ADSL, T2 in the same way for ISDN).

FIG. 1a shows schematically the function of the distribution control means 6, also indicated as "PAC", part of active nodes 4. A distribution control code "dcc" is supplied to the PAC 6 after which the PAC compares the parameters as requested by the user and/or the user terminal 2 with the parameters ("parm") as which are set in the active node at that moment. When the requested parameters differ from the locally set parameters, the local parameters will be brought into conformity with the requested parameters. Moreover, (a replica of the) distribution control code will be forwarded to the next active node in the PID-path towards the information source server 1.

Figure 2:
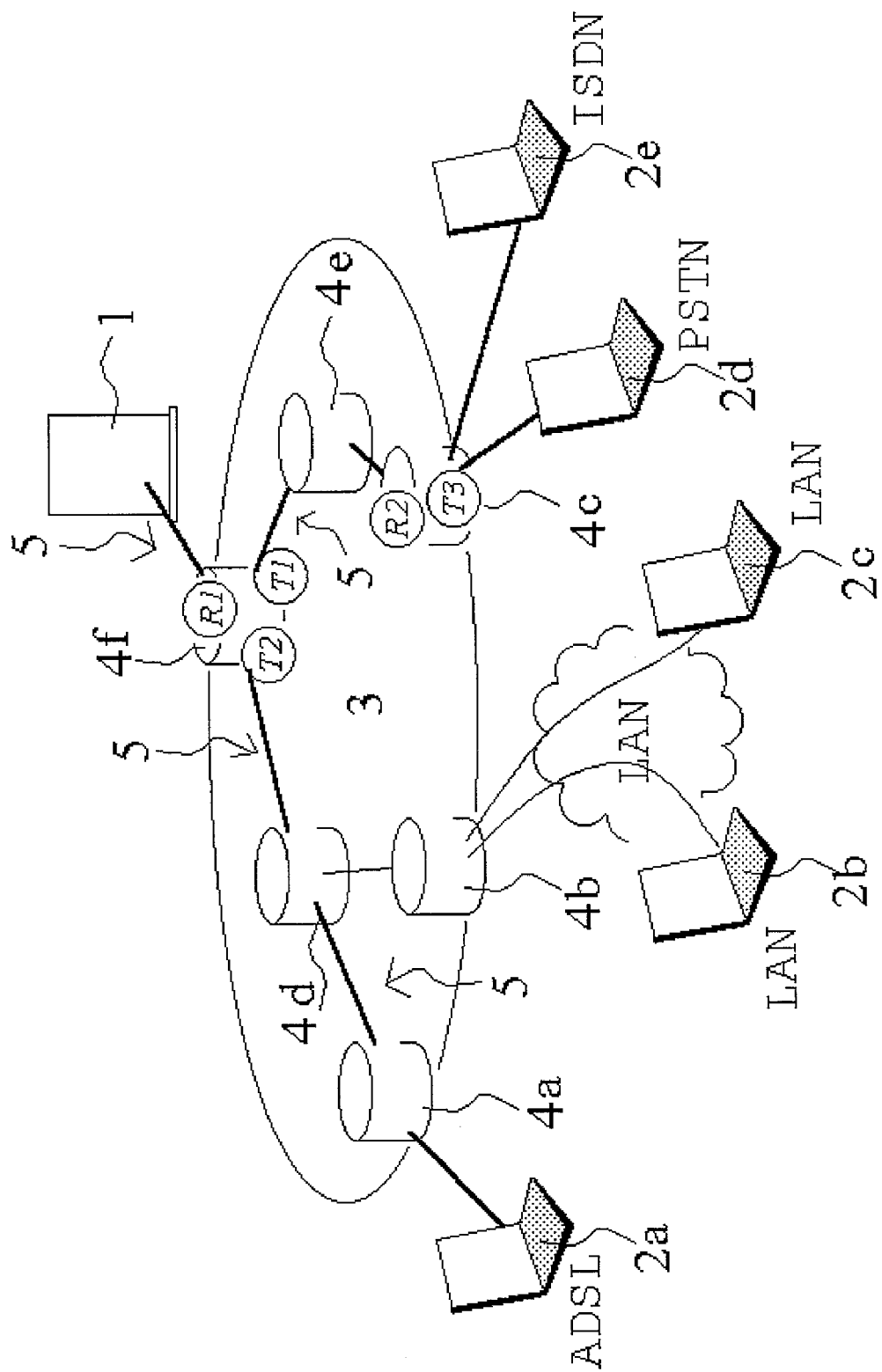
FIG. 2 illustrates modifications, to the block diagram shown in FIG. 1, when a PSTN-user 2d is added to a corresponding PID-tree.
Figure 3:
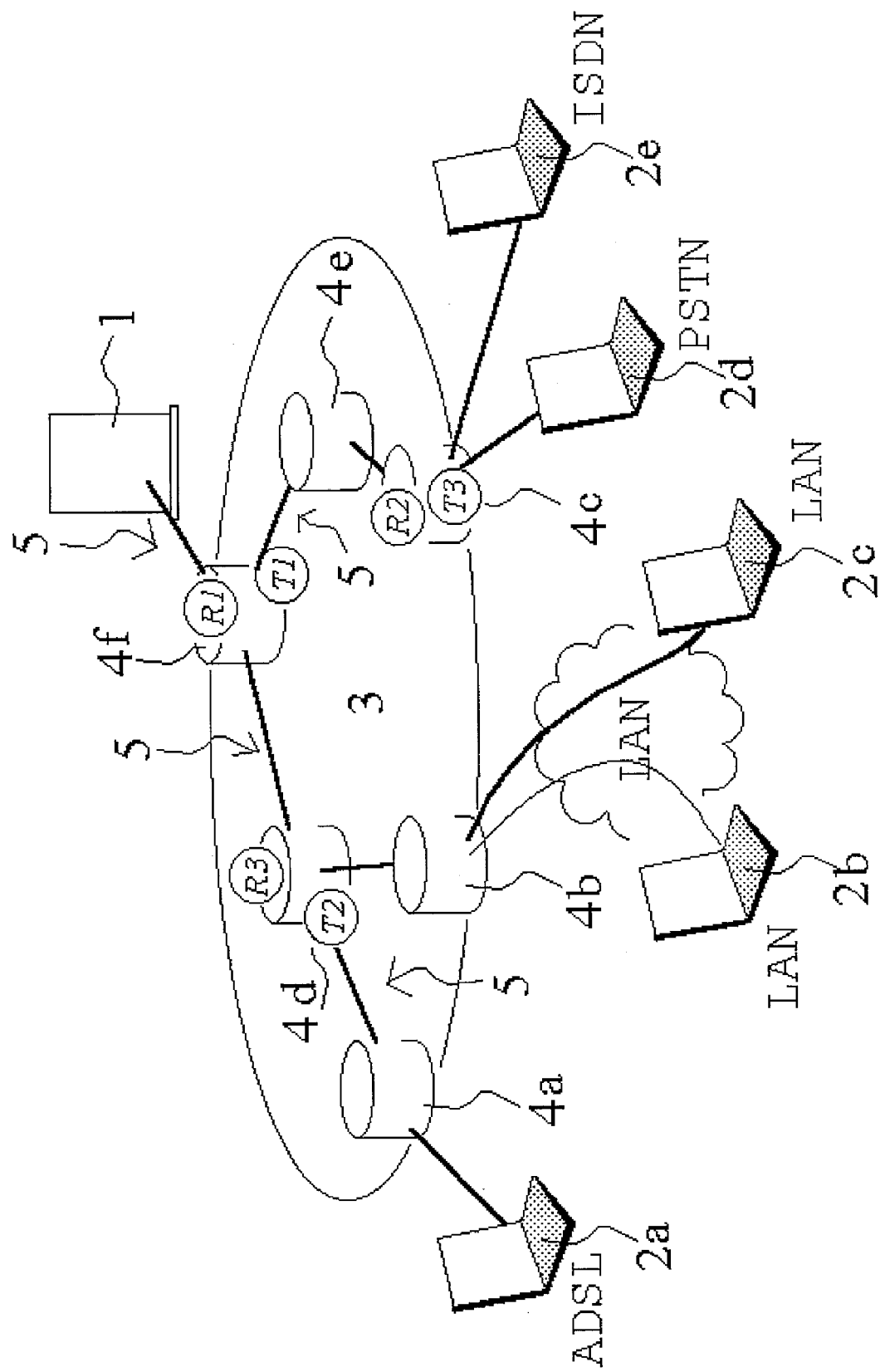
FIG. 3 illustrates a stepwise process, according to the invention, when a LAN-enabled terminal 2c requests accession to the PID service.

FIGS. 2 and 3 show stepwise modifications to this PID-tree when adding users (activation of user terminals). FIG. 2 illustrates the modifications when a PSTN-user 2d is added to the PID-tree.

The relevant user terminal 2d transmits a distribution control code to the first active node of the PID-path between the user terminal and the information source server, viz, active node 4c. The distribution control code dcc (FIG. 1a) represents the user terminal's capability parameters, viz. PSTN, and/or the user's preferences parameters, for instance a preferred use of low resolution video. The control code, after being received by the first active node 4c, is compared in the distribution control means 6 (FIG. 1a) with the local distribution parameters parm (FIG. 1a) already set in the active node, viz, set to be fit for ISDN (terminal 2e). Now the parameters are amended by the control codes: (1) a replication building block R2 is added and (2) a transcoding building block (TBB) T3 is added, the latter being involved with reduction of the bandwidth from ISDN level—fit for terminal 2e—to PSTN level, fit for terminal 2d. While the PID-path between the terminal 2d and the source server 1 comprises some more intermediate nodes, viz, the nodes 4e and 4f, in next step of the "set-up algorithm" a further distribution control code, representing the last active node's 4c new local distribution parameters, is forwarded to the next intermediate active node 4e in the PID-path between the user terminal and the information source server 1. In this intermediate active node 4e its distribution parameters, set in its distribution control means are compared, by those distribution control means, with the parameters as represented by the control code received from the preceding active node 4c and are brought into conformity with the parameters represented by the control code. In this case the distribution parameters do match the capability/preference parameters of ISDN terminal 2e as well as PSTN terminal 2d. For that reason the process is stopped, because the distribution parameters of active node 4e are fit for terminals 2d and 2e. If the parameters would, however, not match the requested or desired terminal/user parameters, the process would be continued stepwise in one or more next steps, until the distribution parameters in the whole PID-branch match the requested terminal/user parameters.

FIG. 3 illustrates the stepwise process according to the invention when a LAN-enabled terminal 2c requests accession to the PID service. In the same way as described above, a distribution control code, representing the parameters fit for LAN terminal 2c bandwidth, high video quality etc.) is sent to active node 4b, which sets its distribution parameters —transmission bandwidth, Quality-of-Service, replication on/off, etc.—accordingly. A transcoding building block will not be necessary if LAN terminal 2c is fit for the "full" output bandwidth of the source server 1, while —as long as no additional terminals are actively connected to node 4b—no replication building block is requested too. The distribution control code initiated by terminal 2c—or a replica distribution control code, in each case a control code representing the terminal's and/or the user's requested capabilities and preferences—subsequently will be forwarded to active node 4d. Comparing, in that node 4d, the parameters set in the control means (PAC) of that node with the parameters as requested by the distribution control code, representing the LAN terminal 2c and its user, will result in setting the parameters in node 4d into conformity with the requested parameters, including in this case the addition of a (new) replication BB, R3, to be involved with replicating the downstream information (packets) from the source towards ADSL terminal 2a and LAN terminal 2c. In a next step, under the control of the (replica of the) distribution control code, the parameters of node 4f will be brought into conformity with the (new) LAN terminal's 2c specifications and the already existing ADSL terminal's 2a specifications, resulting in a move of the transcoding BB T2 involved with reduction from "full" bandwidth to ADSL bandwidth—from active node's 4f PAC (control means) to the node's 4d PAC. In other words, T2 is removed from node 4f and installed in node 4d, enabling a "bandwidth split": full bandwidth to LAN terminal 2c and reduced bandwidth to ADSL terminal 2a.

The invention claimed is:

1. A system for personalized information distribution (PID) of information from an information source server to a plurality of user terminals, wherein the system accommodates a plurality of user terminals each of said terminals requiring a differing communication modality from that required by others of said terminals, the system comprising:
   an information distribution network communicatively connecting said information source server and said user terminals and for distributing the information, via a PID tree, from said information source server to said user terminals, wherein the PID tree provides the information to every one of said terminals at the communication modality required by each of said terminals;
   the PID tree having respective PID-paths between said information source server and corresponding ones of the user terminals, each of said PID-paths having at least one active node so as to define a plurality of active nodes across all of said PID-paths; and
   each of said active nodes having a distribution control means which sets an information distribution process in said each active node in response to local distribution parameters associated with said each active node so as to define the communication modality provided by said each active node over an associated one of said PID-paths in order to satisfy the communication modalities required by all of the terminals, situated downstream of said each active node, communicatively connected to and served through said each active node and said associated PID-path, wherein a distribution control code, originating from either said all user terminals or any other one of the active nodes situated downstream in said PID-tree between said all user terminals and said each active node, is passed upward through the PID-tree to said each active node for use, by said each active node, in managing said local distribution parameters.

2. The system according to claim 1 wherein, to establish or modify any one of said respective PID-paths for distributing said information from the information source server to a given one of the user terminals communicatively connected to and associated with aid one PID-path, the given one user terminal transmits its associated one of the distribution control codes to a first one of the active nodes in said one PID-path, said associated one distribution control code reflects capabilities of or user preferences associated with said given one user terminal; and wherein, within said first active node, the associated one distribution control code is compared, by the distribution control means, with local distribution parameters previously set in said first active node and if the associated one distribution control code does not conform to the local distribution parameters, the local parameters are set to conform to the associated one distribution control code and said associated one distribution control code is forwarded to a next successive one of the active nodes in said one Pm-path so that the associated one distribution control means associated with said next successive active node can compare the distribution control code against the local parameters then existing within said next successive one active node and conform the local parameters for said next successive active node to said associated one distribution control code.

3. The system according to claim 2 wherein said distribution control means, for said one PID-path, comprises a replication building block for replicating the information distributed by the information source server in accordance with the capabilities of or user preferences associated with said given user terminal.

4. The system according to claim 2 wherein said distribution control means, for said one PID-path, comprises a transcoding building block for transcoding the information distributed by the information source server in accordance with the capabilities of or user preferences associated with said given user terminal.

5. A system for personalized information distribution (PID) of information from an information source server to a plurality of user terminals, wherein the system accommodates a plurality of user terminals each of said terminals requiring a differing communication modality from that required by others of said terminals, the system comprising:
   an information distribution network communicatively connecting said information source server and said user terminals and for distributing the information, via a PID tree, from said information source server, downward through a PID-path in said tree, to said user terminals, wherein the PID tree provides the information to every one of said terminals at the communication modality required by each of said terminals;
   the PID tree having a respective PID-path between said information source server and each corresponding one of the user terminals, each of said PID-paths having at least one active node so as to define a plurality of active nodes across all of said PID-paths; and
   each of said active nodes having a distribution control means which sets an information distribution process in said each active node in response to local distribution parameters associated with said each active node so as to define the communication modality provided by said each active node over an associated one of said PID-paths in order to satisfy the communication modalities required by all of the terminals, situated downstream of said each active node, communicatively connected to and served through said each active node and said associated PID-path, said local distribution parameters being managed via said information distribution network and through distribution control codes originated by said user terminals or other ones of the active nodes in the PID-tree, wherein:
      for a given one of said PID-paths that contains a plurality of said active nodes situated at differing hierarchical levels of said given one PID-path, a first active node located at a first hierarchical level in said given one PID-path communicates its associated one of the distribution control codes upward through said given one PID-path to a second active node situated at a second hierarchical level, higher than the first level, in said given one PID-path such that said second active node sets its own local distribution parameters, in response to the associated one distribution control code it received from the first active node as well as any of the distribution control codes received from other ones of said active nodes in said PID-tree.

6. The system according to claim 5 wherein the second active node further generates its associated one of the distribution control codes to be communicated upward through said given one PID-path to a third active node situated at a third hierarchical level, situated higher than the second level, in said given one PID-path.

7. The system according to claim 5 wherein, to establish or modify the given one PID-path for distributing said information from the information source server to a given one of the user terminals communicatively connected to and associated with said given one PID-path, the given one user terminal transmits its associated one of the distribution control codes to said first active node, said associated one distribution control code reflects capabilities of or user preferences associated with said given one user terminal; and wherein, within said first active node, the associated one distribution control code is compared, by the distribution control means, with the local distribution parameters previously set in the first active node and if the associated one distribution control code does not conform to the local distribution parameters, the distribution control means sets the local distribution parameters to conform to the associated one distribution control code and forwards the associated one distribution control code to the second active node in said given PID-path so that the distribution control means associated with said second node can compare the associated one distribution control code received from the first active node against the local parameters then existing within said second active node and conform the local parameters for said second successive active node to the associated one distribution control code.

8. The system according to claim 7 wherein said distribution control means, for said given one PID-path, comprises a replication building block for replicating the information distributed by the formation source server in accordance with the capabilities of or user preferences associated with said given user terminal.

9. The system according to claim 7 wherein said distribution control means, for said given one PID-path, comprises a transcoding building block for transcoding the information distributed by the information source server in accordance with the capabilities of or user preferences associated with said given user terminal.

* * * * *